(12) United States Patent
O'Day

(10) Patent No.: US 7,275,303 B1
(45) Date of Patent: Oct. 2, 2007

(54) METHOD FOR MAKING A DISC DRIVE

(75) Inventor: Richard F. O'Day, Westborough, MA (US)

(73) Assignee: Maxtor Corporation, Scotts Valley, CA (US)

( * ) Notice: Subject to any disclaimer, the term of this patent is extended or adjusted under 35 U.S.C. 154(b) by 433 days.

(21) Appl. No.: 10/735,971

(22) Filed: Dec. 15, 2003

Related U.S. Application Data

(60) Provisional application No. 60/452,616, filed on Mar. 6, 2003.

(51) Int. Cl.
 *G11B 5/127* (2006.01)
 *H04R 31/00* (2006.01)

(52) U.S. Cl. .................. 29/603.04; 29/606; 29/607; 360/264.7; 360/264.9; 360/266.4; 360/294.5

(58) Field of Classification Search ............... 29/592.1, 29/602.1, 603.03, 603.04, 606, 607; 360/264.7–264.9, 360/266.4, 294.5
 See application file for complete search history.

(56) References Cited

U.S. PATENT DOCUMENTS

| | | | | |
|---|---|---|---|---|
| 3,955,315 A | * | 5/1976 | Goodman | 446/133 |
| 5,734,527 A | * | 3/1998 | Reinhart | 360/256.2 |
| 5,956,213 A | * | 9/1999 | Dague et al. | 360/256.2 |
| 6,532,136 B2 | * | 3/2003 | Bae et al. | 360/256.2 |
| 6,710,981 B1 | * | 3/2004 | Oveyssi et al. | 360/264.9 |

FOREIGN PATENT DOCUMENTS

JP 11039810 A * 2/1999

OTHER PUBLICATIONS

"Processing of Neodymium-Iron-Boron melt-spun ribbons to fully dense magnets"; Lee, R.; Brewer, E.; Schaffel, N.; Magnetics, IEEE Transactions on vol. 21, Issue 5; Sep. 1985; pp. 1958-1963.*

* cited by examiner

*Primary Examiner*—Paul D. Kim
(74) *Attorney, Agent, or Firm*—Derek J. Berger

(57) ABSTRACT

The upper voice coil motor magnet assembly (64a') of a disk drive (10') is magnetically aligned with the lower voice coil motor magnet assembly (64b') using an alignment fixture (126). The alignment fixture (126) engages the upper voice coil motor magnet assembly (64a') and lifts the same into a suspended position above the lower voice coil motor magnet assembly (64b'). In this suspended condition, the alignment fixture (126) allows the magnetic field to move the upper voice coil motor magnet assembly (64a') within the horizontal dimension to a magnetically aligned position with the lower voice coil motor magnet assembly (64b'). Thereafter, the alignment fixture (126) lowers the upper voice coil motor magnet assembly (64a') to a position where the same is again supported above the lower voice coil motor magnet assembly (64b').

39 Claims, 10 Drawing Sheets

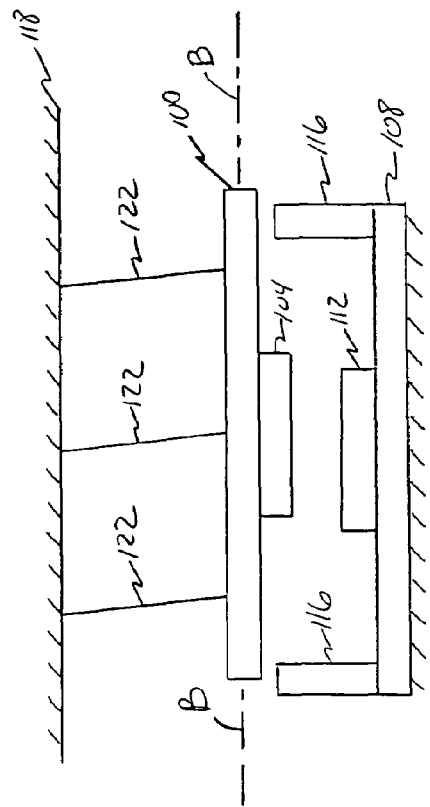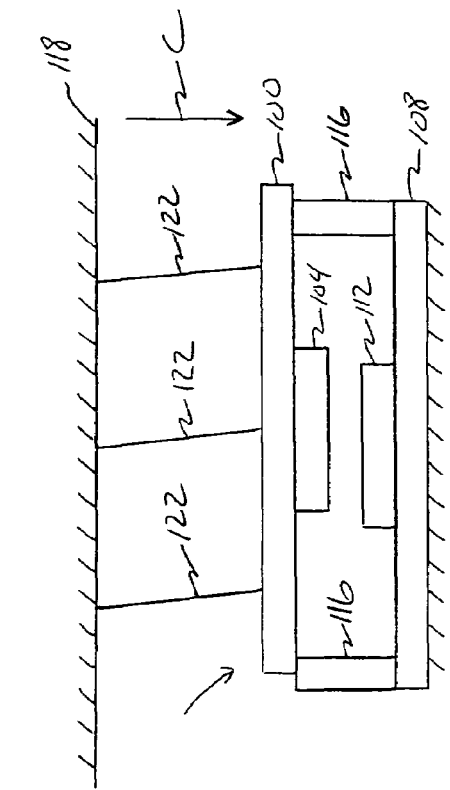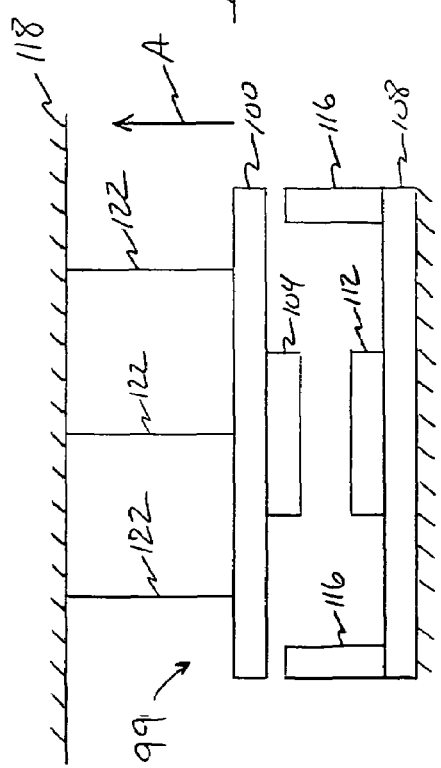

METHOD FOR MAKING A DISC DRIVE

CROSS-REFERENCE TO RELATED APPLICATIONS

This patent application claims priority under 35 U.S.C. §119(e) to U.S. Patent Application Ser. No. 60/452,616, that is entitled "Voice Coil Motor Magnetic Self-Alignment Process and Tool," that was filed on Mar. 6, 2003, and the entire disclosure of which is incorporated by reference in its entirety herein.

FIELD OF THE INVENTION

The present invention generally relates to the field of disk drives and, more particularly, to magnetically aligning an upper voice coil motor magnet with a lower voice coil motor magnet to reduce a vibration of the head positioner assembly caused by out-of-plane magnetic field force components being exerted on the head positioner assembly, to in turn reduce the amount of time required for the head(s) of the head positioner assembly to settle on the desired track of its corresponding data storage disk.

BACKGROUND OF THE INVENTION

Voice coil motors are commonly used in the disk drive industry to move a head positioner assembly relative to one or more rotating data storage disks. The head positioner assembly includes an actuator of any number of types/configurations (e.g., a single actuator arm, a plurality of stacked actuator arms, an actuator body with a plurality of actuator arm tips extending therefrom (e.g., an "E" block)). Other components of the head positioner assembly include a suspension for each data storage surface of each data storage disk incorporated in the drive, as well as a head mounted on each suspension. A head positioner assembly that includes a plurality of suspensions (and thereby a plurality of actuator arms or actuator arm tips) is commonly referred to in the art as a head stack assembly or HSA.

An upper voice coil motor (VCM) assembly and a lower voice coil motor (VCM) assembly of the voice coil motor are disposed in vertically spaced relation within the drive. One or both of the upper VCM assembly and the lower VCM assembly include a magnet and typically at least some type of a steel housing to provide a magnetic circuit path and to support/retain the magnet. A coil is appropriately mounted on the head positioner assembly, and is positioned in a space between the upper VCM assembly and the lower VCM assembly. The magnetic field causes the coil to move in a predetermined manner relative to the stationery upper VCM assembly and the stationery lower VCM assembly. This then causes the head positioner assembly to move so as to position each head at the desired track of its corresponding data storage disk.

The total amount of time required to move the head positioner assembly from one position to another position, and to thereafter be able to exchange information with the relevant data storage disk(s), obviously has an overall effect on disk drive operations. Vibration of the head positioner assembly may increase the amount of time for its various heads to settle on the correct track of the corresponding data storage disk. One could use a number approaches to address this condition. One would be to move the head positioner assembly at a slower rate. This may minimize/dampen vibrations, but is inefficient from a time standpoint. Another approach would be to move the head positioner assembly at a higher rate, and wait for the resulting vibrations to sufficiently dampen. This is also inefficient from a time standpoint.

Another approach to reducing the total amount of time required to move the head positioner assembly from one position to another, and to thereafter be able to exchange information with the relevant data storage disk(s), is to attempt to minimize mechanical vibrations of the head positioner assembly by somehow aligning the upper VCM assembly with the lower VCM assembly. All known techniques in the disk drive industry use a purely mechanical alignment or registration. Mechanical alignment not only increases costs since more precision is required for the manufacture of the upper VCM assembly, the lower VCM assembly, and/or tooling used to install the same, but purely mechanical alignments may not consistently magnetically align the upper VCM assembly with the lower VCM assembly. Out-of-plane magnetic field force components may then still exist, which may excite vibrational modes in the head positioner assembly, that in turn increases the seek or settle time of the drive's head(s).

BRIEF SUMMARY OF THE INVENTION

The present invention generally relates to a disk drive in which the upper voice coil motor magnet is magnetically aligned with the lower voice coil motor magnet to enhance the application of those forces on the head positioner assembly that move the head positioner assembly for disk drive operations. Both the method of magnetically aligning the upper voice coil motor magnet with the lower voice coil motor magnet, as well as the resulting aligned configuration, are encompassed by the present invention. The tooling used to provide this alignment is also within the scope of the present invention.

A first aspect of the present invention is embodied by a method for assembling a disk drive. A lower voice coil motor magnet and a head positioner assembly are installed such that a coil associated with the head positioner assembly is disposed above the lower voice coil motor magnet. An upper voice coil motor magnet is suspended above the lower voice coil motor magnet. During this suspended state or condition, the upper voice coil motor magnet is magnetically aligned with the lower voice coil motor magnet.

Various refinements exist of the features noted in relation to the first aspect of the present invention. Further features may also be incorporated in the first aspect of the present invention as well. These refinements and additional features may exist individually or in any combination. The lower voice coil motor magnet may be mechanically anchored to a disk drive housing, such as a base plate of the disk drive. The head positioner assembly may be of any appropriate type/configuration, but will typically include an actuator (e.g., a single actuator arm, a plurality of actuator arms disposed in a stack, an actuator body with one or more of actuator arm tips extending therefrom (e.g., an "E" block)), a load beam or suspension for each actuator arm or actuator arm tip, and a head for each suspension (e.g., in the form of a head/gimbal assembly). Typically the head positioner assembly will be movably interconnected with a base plate and/or cover of the disk drive via a pivot bearing or the like.

Any movement of the upper voice coil motor magnet during its suspension so as to magnetically align with the lower voice coil motor magnet in the case of the first aspect may be solely due to the magnetic field between the upper and lower voice coil motor magnets. That is, no other forces need be exerted on the upper voice coil motor magnet so as to move the same to its magnetically aligned position. In this respect, the first aspect may be characterized as allowing the upper voice coil motor magnet to magnetically "self-align" with the lower voice coil motor magnet by being held in a suspended state.

Suspending the upper voice coil motor magnet in accordance with the first aspect may be characterized as allowing the upper voice coil motor magnet to move within a single dimension or reference plane (e.g., horizontally) for magnetic alignment with the lower voice coil motor magnet. Any appropriate movement within this reference plane may be undertaken, including translational/axial motion, rotational motion, or a combination thereof. Preferably the upper voice coil motor magnet and the lower voice coil motor magnet are maintained in parallel relation during the suspension and any resulting movement of the upper voice coil motor magnet into magnetic alignment with the lower voice coil motor magnet. Moreover, preferably the upper voice coil motor magnet is suspended in such a manner that there is at least somewhat of a reduced resistance to movement of the upper voice coil motor magnet in a dimension that magnetically aligns the same with the lower voice coil motor magnet (e.g., within a horizontal dimension). In one embodiment, the upper voice coil motor magnet is suspended such that a resistance of no more than about 0.03 Newtons exists to a movement of the upper voice coil motor magnet within a dimension that magnetically aligns the same with the lower voice coil motor magnet.

In one embodiment of the first aspect, an alignment fixture includes first and second fixtures that are interconnected by a plurality of members that are compliant in the horizontal dimension, but sufficiently stiff in the vertical dimension so as to resist movement of the upper voice coil motor magnet toward the lower voice coil motor magnet while the upper voice coil motor magnet is being suspended for magnetic alignment with the lower voice coil motor magnet. The second fixture may detachably engage the upper voice coil motor magnet in any appropriate manner. Magnetically aligning the upper voice coil motor magnet to the lower voice coil motor magnet may entail elastically deforming at least one of, and more typically each of, the plurality of compliant members to allow the second fixture (and the upper voice coil motor magnet engaged thereby) to move relative to the first fixture.

Another way to characterize the suspension of the upper voice coil motor magnet in the case of the first aspect is that it may be suspended from a first fixture using at least two elongate members. The magnetic alignment may be achieved by exerting a bending force, a torsional force, or both, on one or more of these elongate members. In one embodiment, first, second, and third wires extend between and interconnect first and second fixtures, with the second fixture being detachably engageable with the upper voice coil motor magnet. These three wires provide a significantly greater resistance to a movement of the upper voice coil motor magnet toward the lower voice coil motor magnet in a vertical dimension (e.g., corresponding with the length of the wires), than to a movement in a horizontal dimension. Stated another way, the three wires allow the upper voice coil motor magnet to move within the horizontal dimension to magnetically align with the lower voice coil motor magnet, and further constrain this movement to within the horizontal dimension by the noted stiffness of the three wires in the vertical dimension. This then maintains the upper voice coil motor magnet and the lower voice coil motor magnet in parallel relation during the suspension and resulting magnetic alignment of the upper and lower voice coil motor magnets.

Any appropriate fixture may be utilized in the magnetic alignment of the upper voice coil motor magnet to the lower voice coil motor magnet in relation to the first aspect. However, any such fixture should be configured to maintain the upper voice coil motor magnet in a suspended state and yet still allow the upper voice coil motor magnet to move in a dimension that magnetically aligns the same with the lower voice coil motor magnet, preferably without providing any significant resistance to this movement. That is, the fixture should resist movement of the upper voice coil motor magnet toward the lower voice coil motor magnet in a first dimension (e.g., the vertical dimension) so as to maintain the suspended condition, while allowing the magnetic field between the upper and lower voice coil motor magnets to move the upper voice coil motor magnet within a second dimension that is perpendicular to the first dimension (e.g., the horizontal dimension) to establish the magnetically aligned relationship. Stated another way, the fixture should provide a first resistance to a movement of the upper voice coil motor magnet toward the lower voice coil motor magnet in the vertical dimension that is substantially greater than a second resistance to a movement of the upper voice coil motor magnet within the horizontal dimension to realize magnetic alignment with the lower voice coil motor magnet.

There are a number of ways of characterizing the magnetic alignment that is encompassed by the first aspect. One is that the magnetic alignment orients the magnetic field lines extending between the upper voice coil motor magnet and the lower voice coil motor magnet to be parallel with an axis about which the head positioner assembly moves during disk drive operations. Another is that the magnetic alignment increases the verticality of the magnetic field lines extending between the upper voice coil motor magnet and the lower voice coil motor magnet. Another is that the magnetic alignment minimizes a non-vertical component of the magnetic field extending between the upper voice coil motor magnet and the lower voice coil motor magnet. Another is that the magnetic alignment maximizes a vertical component of the magnetic field extending between the upper voice coil motor magnet and the lower voice coil motor magnet.

The magnetic alignment of the upper voice coil motor magnet to the lower voice coil motor magnet in the case of the first aspect may be viewed as enhancing the application of the forces on the head positioner assembly that move the same for disk drive operations. The magnetic alignment may be characterized as minimizing the out-of-plane forces that are exerted on the head positioner assembly for moving the same during disk drive operations. Consider the case where the head positioner assembly moves within a horizontal dimension during disk drive operations. The magnetic alignment may be characterized as reducing the angle between the forces that are exerted on the head positioner assembly to move the head positioner assembly and the horizontal dimension in which the head positioner assembly moves. Preferably, the forces that are exerted on the head positioner assembly to move the same for disk drive operations are coplanar with or parallel to the dimension in which the head positioner assembly moves during disk drive operations.

One way in which the methodology encompassed by the first aspect may be implemented would be to allow the upper voice coil motor magnet to be supported above the lower voice coil motor magnet, with the coil attached to the head positioner assembly thereby being disposed therebetween.

Any mechanical anchoring of the upper voice coil motor magnet would be at least reduced (e.g., by loosening mounting screws) and more preferably entirely removed (e.g., by removal of mounting screws) such that the upper voice coil motor magnet could be lifted away from the lower voice coil motor magnet to the suspended position. The upper voice coil motor magnet and the lower voice coil motor magnet may be separated by any appropriate distance during this suspension, so long as the magnetic forces remain of a sufficient strength so as to be able to move the upper voice coil motor magnet into the magnetically aligned position. Once the upper voice coil motor magnet has been allowed to settle in this magnetically aligned position, the upper voice coil motor magnet may be lowered or returned to its supported position above the lower voice coil motor magnet while maintaining this magnetically aligned relationship. Although the magnetic field between the upper and lower voice coil motor magnets is typically of a sufficient strength to maintain a relative positioning between these two components, one or more mechanical fasteners may be used to mechanically anchor the upper voice coil motor magnet after being magnetically aligned.

A second aspect of the present invention is embodied by a method for assembling a disk drive. A lower voice coil motor magnet and a head positioner assembly are installed such that a coil associated with the head positioner assembly is disposed above the lower voice coil motor magnet. An upper voice coil motor magnet is moved to a first orientation relative to the lower voice coil motor magnet using a magnetic field between the upper and lower voice coil motor magnets. The upper and lower voice coil motor magnets remain in parallel relation during this movement.

Various refinements exist of the features noted in relation to the second aspect of the present invention. Further features may also be incorporated in the second aspect of the present invention as well. These refinements and additional features may exist individually or in any combination. The lower voice coil motor magnet may be mechanically anchored to a disk drive housing, such as a base plate of the disk drive. The head positioner assembly may be of any appropriate type/configuration, but will typically include an actuator (e.g., a single actuator arm, a plurality of actuator arms disposed in a stack, an actuator body with one or more of actuator arm tips extending therefrom (e.g., an "E" block)), a load beam or suspension for each actuator arm or actuator arm tip, and a head for each suspension (e.g., in the form of a head/gimbal assembly). Typically the head positioner assembly will be movably interconnected with a base plate and/or cover of the disk drive via a pivot bearing or the like.

The movement of the upper voice coil motor magnet in the case of the second aspect may be characterized as at least improving upon a magnetic alignment of the upper voice coil motor magnet to the lower voice coil motor magnet. Preferably the upper voice coil motor magnet is magnetically aligned with the lower voice coil motor magnet when the upper voice coil motor magnet is moved to its first orientation. There are a number of ways of characterizing "magnetic alignment" in relation to the second aspect. One is that the magnetic alignment orients the magnetic field lines extending between the upper voice coil motor magnet and the lower voice coil motor magnet to be parallel with an axis about which the head positioner assembly moves during disk drive operations. Another is that the magnetic alignment increases the verticality of the magnetic field lines extending between the upper voice coil motor magnet and the lower voice coil motor magnet. Another is that the magnetic alignment minimizes a non-vertical component of the magnetic field extending between the upper voice coil motor magnet and the lower voice coil motor magnet. Another is that the magnetic alignment maximizes a vertical component of the magnetic field extending between the upper voice coil motor magnet and the lower voice coil motor magnet.

Any magnetic alignment of the upper voice coil motor magnet to the lower voice coil motor magnet in the case of the second aspect may be viewed as enhancing the application of the forces on the head positioner assembly that move the same for disk drive operations. The magnetic alignment may be characterized as minimizing the out-of-plane forces that are exerted on the head positioner assembly for moving the same during disk drive operations. Consider the case where the head positioner assembly moves within a horizontal dimension during disk drive operations. The magnetic alignment may be characterized as reducing the angle between the forces that are exerted on the head positioner assembly to move the head positioner assembly and the horizontal dimension in which the head positioner assembly moves. Preferably, the forces that are exerted on the head positioner assembly to move the same for disk drive operations are coplanar with or parallel to the dimension in which the head positioner assembly moves during disk drive operations.

The upper voice coil motor magnet may be in a suspended condition or state when moving to its first orientation in the case of the second aspect. Suspending the upper voice coil motor magnet in accordance with the second aspect may be characterized as allowing the upper voice coil motor magnet to move within a single dimension or reference plane (e.g., horizontally) for magnetic alignment with the lower voice coil motor magnet. Any appropriate movement within this reference plane may be undertaken, including translational/axial motion, rotational motion, or a combination thereof. Preferably the upper voice coil motor magnet and the lower voice coil motor magnet are maintained in parallel relation during the suspension and any resulting movement of the upper voice coil motor magnet into magnetic alignment with the lower voice coil motor magnet. Moreover, preferably the upper voice coil motor magnet is suspended in such a manner that there is a reduced resistance to movement of the upper voice coil motor magnet in a dimension that magnetically aligns the same with the lower voice coil motor magnet (e.g., within a horizontal dimension). In one embodiment, the upper voice coil motor magnet is suspended such that a resistance of no more than about 0.03 Newtons exists to a movement of the upper voice coil motor magnet within a dimension that magnetically aligns the same with the lower voice coil motor magnet.

In one embodiment of the second aspect, an alignment fixture includes first and second fixtures that are interconnected by a plurality of members that are compliant in the horizontal dimension, but sufficiently stiff in the vertical dimension so as to resist movement of the upper voice coil motor magnet toward the lower voice coil motor magnet while the upper voice coil motor magnet is being suspended for magnetic alignment with the lower voice coil motor magnet. The second fixture may detachably engage the upper voice coil motor magnet in any appropriate manner. Movement of the upper voice coil motor magnet may entail elastically deforming at least one of, and more typically each of, the plurality of compliant members to allow the second fixture (and the upper voice coil motor engaged thereby) to move relative to the first fixture.

Another way to characterize a suspension of the upper voice coil motor magnet in the case of the second aspect is that it may be suspended from a first fixture using at least two elongate members. The magnetic alignment may be achieved by exerting a bending force, a torsional force, or both, on one or more of these elongate members. In one embodiment, first, second, and third wires extend between and interconnect first and second fixtures, with the second fixture being detachably engageable with the upper voice coil motor magnet. These three wires provide a significantly greater resistance to a movement of the upper voice coil motor magnet toward the lower voice coil motor magnet in a vertical dimension (e.g., corresponding with the length of the wires), than to a movement in a horizontal dimension. Stated another way, the three wires allow the upper voice coil motor magnet to move within the horizontal dimension to magnetically align with the lower voice coil motor magnet, and further constrain this movement to within the horizontal dimension by the noted stiffness of the three wires in the vertical dimension. This then maintains the upper voice coil motor magnet and the lower voice coil motor magnet in parallel relation during the suspension and resulting magnetic alignment of the upper and lower voice coil motor magnets.

Any appropriate fixture may be utilized in the magnetic alignment of the upper voice coil motor magnet to the lower voice coil motor magnet in relation to the second aspect by a suspension of the upper voice coil motor magnet. However, any such fixture should be configured to maintain the upper voice coil motor magnet in a suspended state and yet still allow the upper voice coil motor magnet to move in a dimension that magnetically aligns the same with the lower voice coil motor magnet, preferably without providing any significant resistance to this movement. That is, the fixture should resist movement of the upper voice coil motor magnet toward the lower voice coil motor magnet in a first dimension (e.g., the vertical dimension), while allowing the magnetic field between the upper and lower voice coil motor magnets to move the upper voice coil motor magnet within a second dimension that is perpendicular to the first dimension (e.g., the horizontal dimension) to establish the magnetically aligned relationship. Stated another way, the fixture should provide a first resistance to a movement of the upper voice coil motor magnet toward the lower voice coil motor magnet in the vertical dimension that is substantially greater than a second resistance to a movement of the upper voice coil motor magnet within the horizontal dimension to realize magnetic alignment with the lower voice coil motor magnet.

One way in which the methodology encompassed by the second aspect may be implemented would be to allow the upper voice coil motor magnet to be supported above the lower voice coil motor magnet, with the coil attached to the actuator thereby being disposed therebetween. Any mechanical anchoring of the upper voice coil motor magnet would at least be reduced (e.g., by loosening mounting screws) and more preferably entirely removed (e.g., by removal of mounting screws) such that the upper voice coil motor magnet could be lifted away from the lower voice coil motor magnet to a suspended position. The upper voice coil motor magnet and the lower voice coil motor magnet may be separated by any appropriate distance during this suspension, so long as the magnetic forces remain of a sufficient strength so as to be able to move the upper voice coil motor magnet into the magnetically aligned position. Once the upper voice coil motor magnet has been allowed to settle in this magnetically aligned position, the upper voice coil motor magnet may be lowered or returned to its supported position above the lower voice coil motor magnet while maintaining this magnetically aligned relationship. Although the magnetic field between the upper and lower voice coil motor magnets is typically of a sufficient strength to maintain a relative positioning between these two components, typically one or more mechanical fasteners will be used to mechanically anchor the upper voice coil motor magnet after being magnetically aligned.

BRIEF DESCRIPTION OF THE SEVERAL VIEWS OF THE DRAWING

FIG. 5A is a schematic (side view elevation) of one embodiment of a disk drive voice coil motor prior to the anchoring an upper voice coil motor magnet relative to a lower voice coil motor magnet.

FIG. 5B is a schematic (side view elevation) of an alignment fixture having lifted the upper voice coil motor magnet away from the lower voice coil motor magnet to a suspended position.

FIG. 5C is a schematic (side view elevation) of the upper voice coil motor magnet and the lower voice coil motor magnet after the magnetic field has moved the upper voice coil motor magnet into a magnetically aligned position with the lower voice coil motor magnet.

FIG. 5D is a schematic (side view elevation) of the alignment fixture having lowered the upper voice coil motor magnet back into a vertically supported position, while remaining in its magnetically aligned position with the lower voice coil motor magnet.

DETAILED DESCRIPTION OF THE INVENTION

Figure 1:
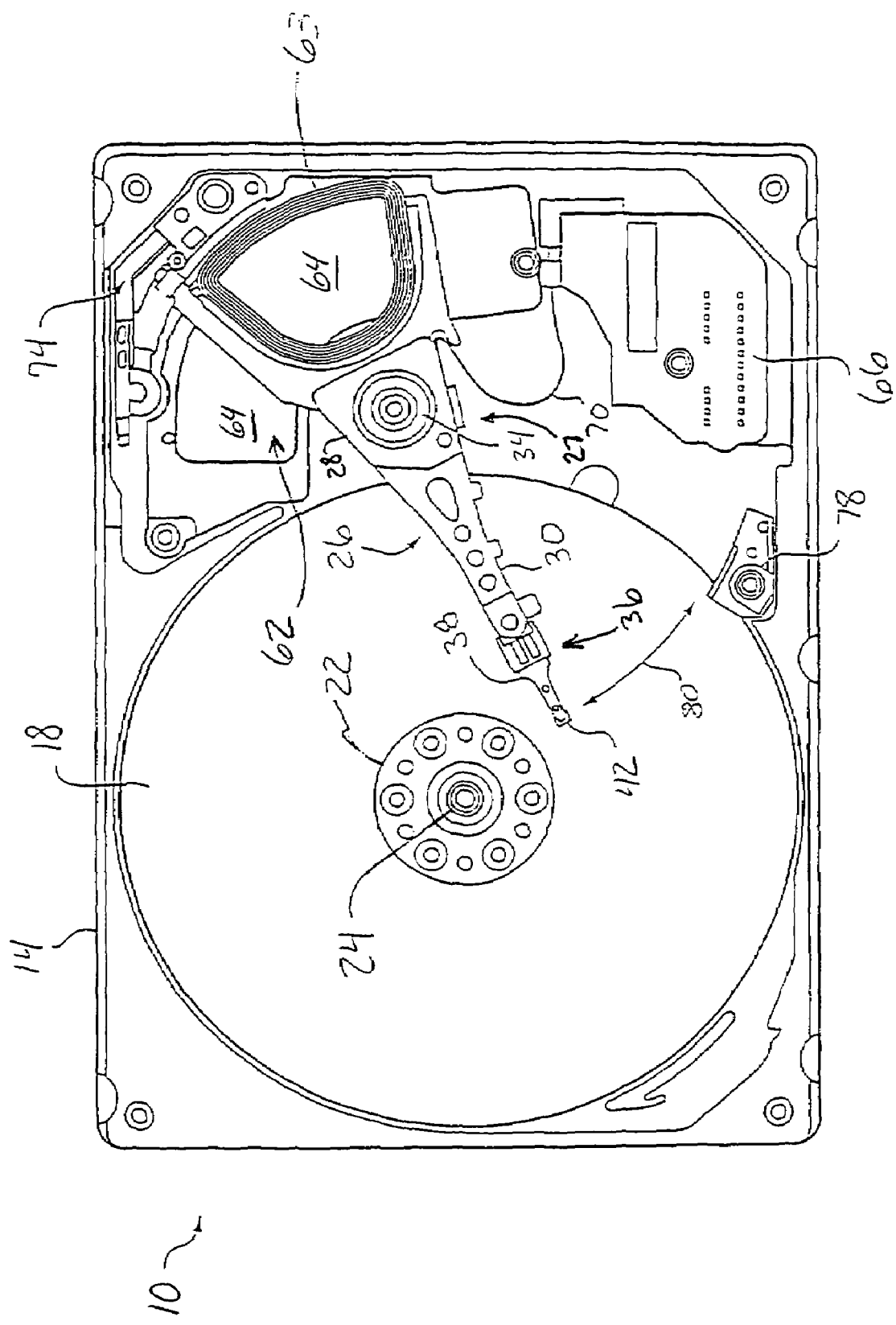
FIG. 1 is a top or plan view of one embodiment of a disk drive.
Figure 2:
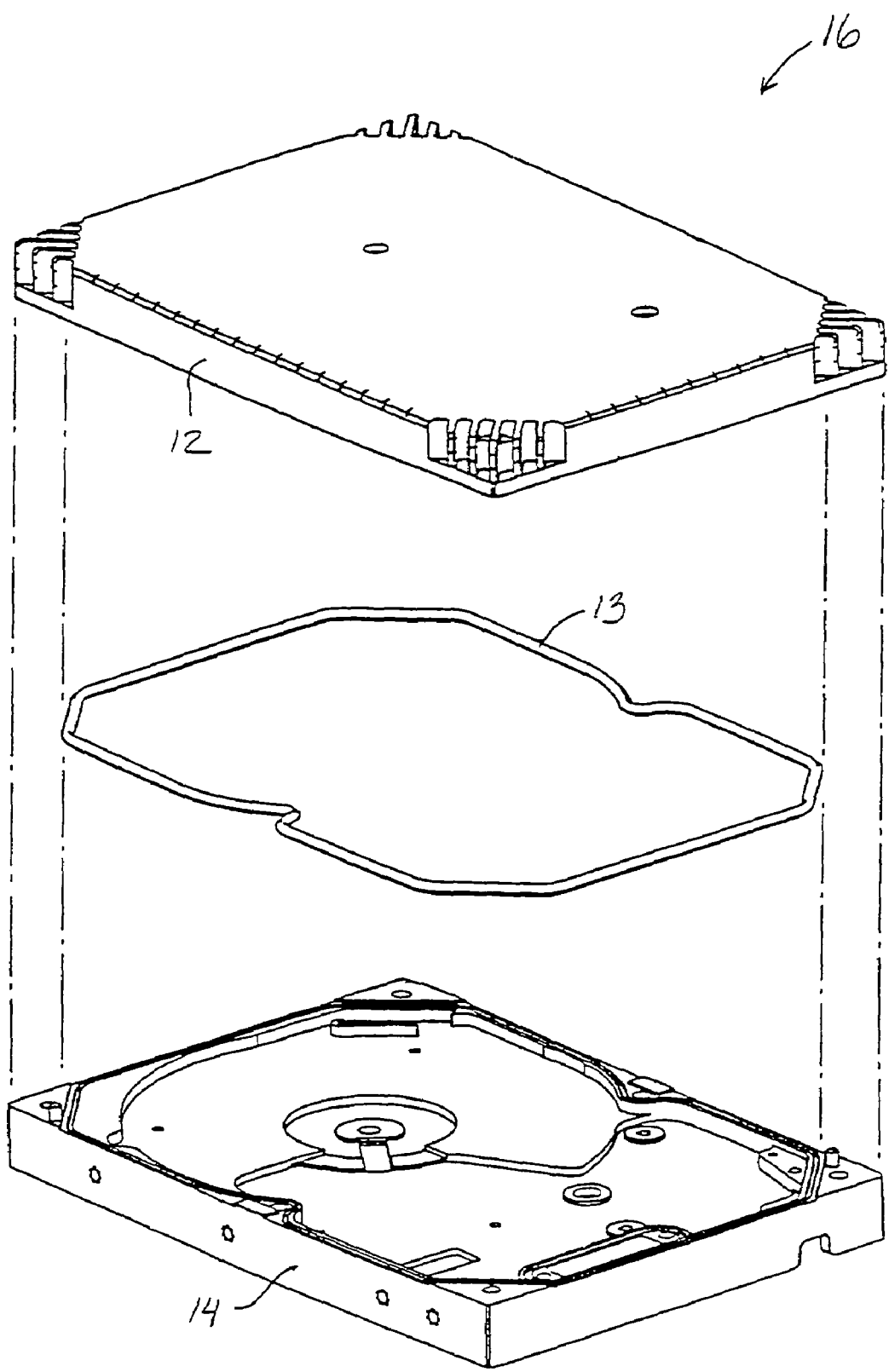
FIG. 2 is an exploded, perspective view of one embodiment of a disk drive housing that may be utilized by the disk drive of FIG. 1.

The present invention will now be described in relation to the accompanying drawings that at least assist in illustrating its various pertinent features. One embodiment of a disk drive 10 is illustrated in FIGS. 1-4. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. Multiple data storage disks 18 would be mounted in vertically spaced and parallel relation on the hub. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 would be disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each individually mounted directly on the pivot bearing 34.

Movement of the head positioner assembly 26 is provided by an appropriate drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly 64 that is disposed above and below this coil 63 (the upper VCM assembly not being shown in FIG. 1). The VCM magnet assemblies 64 each include a magnet and will typically be mounted on the housing 16. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 along a path 80 and "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 includes a ramp assembly 78 that is disposed beyond a perimeter of the data storage disk 18 in the illustrated configuration to typically both move the corresponding slider 42 vertically away from its corresponding data storage disk 18 and to also exert somewhat of a retaining force on the corresponding actuator arm 30. Any configuration for the ramp assembly 78 that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 includes an actuator arm assembly latch 74 that moves from a non-latching position to a latching position to engage an actuator arm 30 so as to preclude the same from pivoting in a direction which would tend to drag the slider(s) 42 across its corresponding data storage disk 18.

Figure 3:
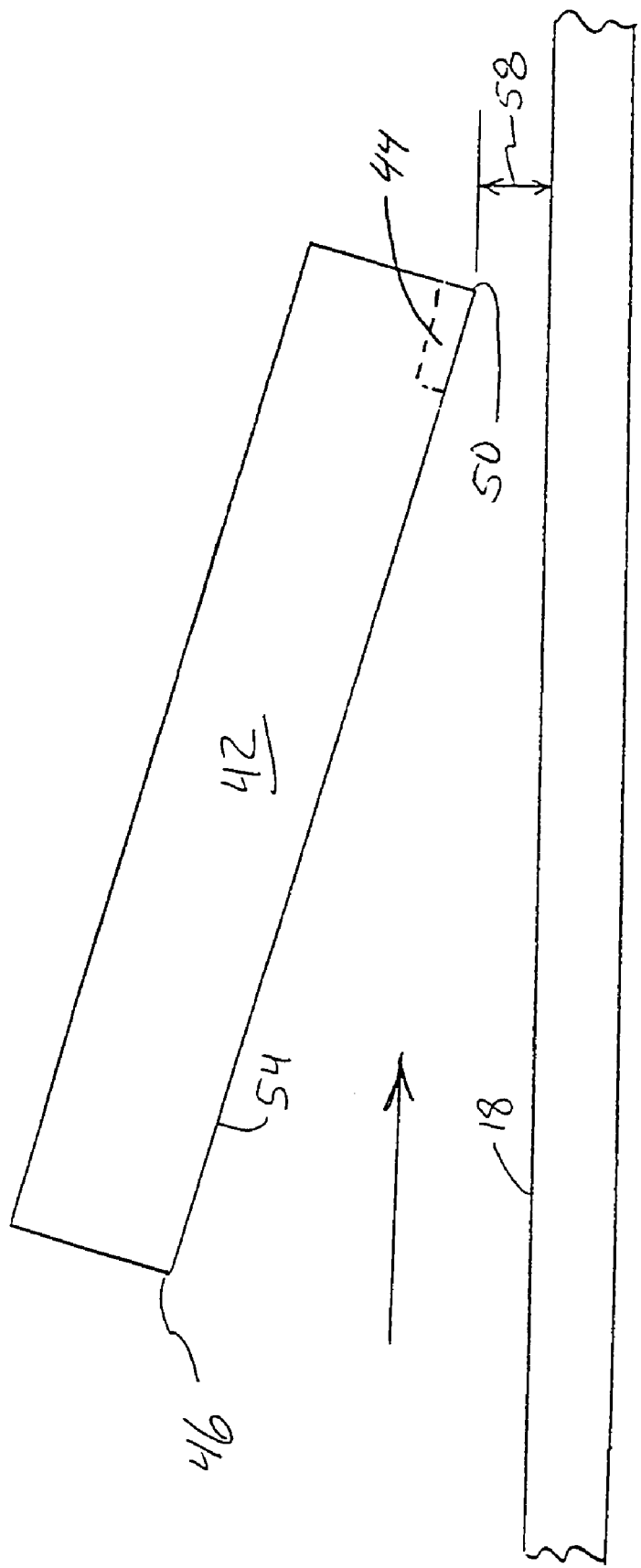
FIG. 3 is a side view of one embodiment of a flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
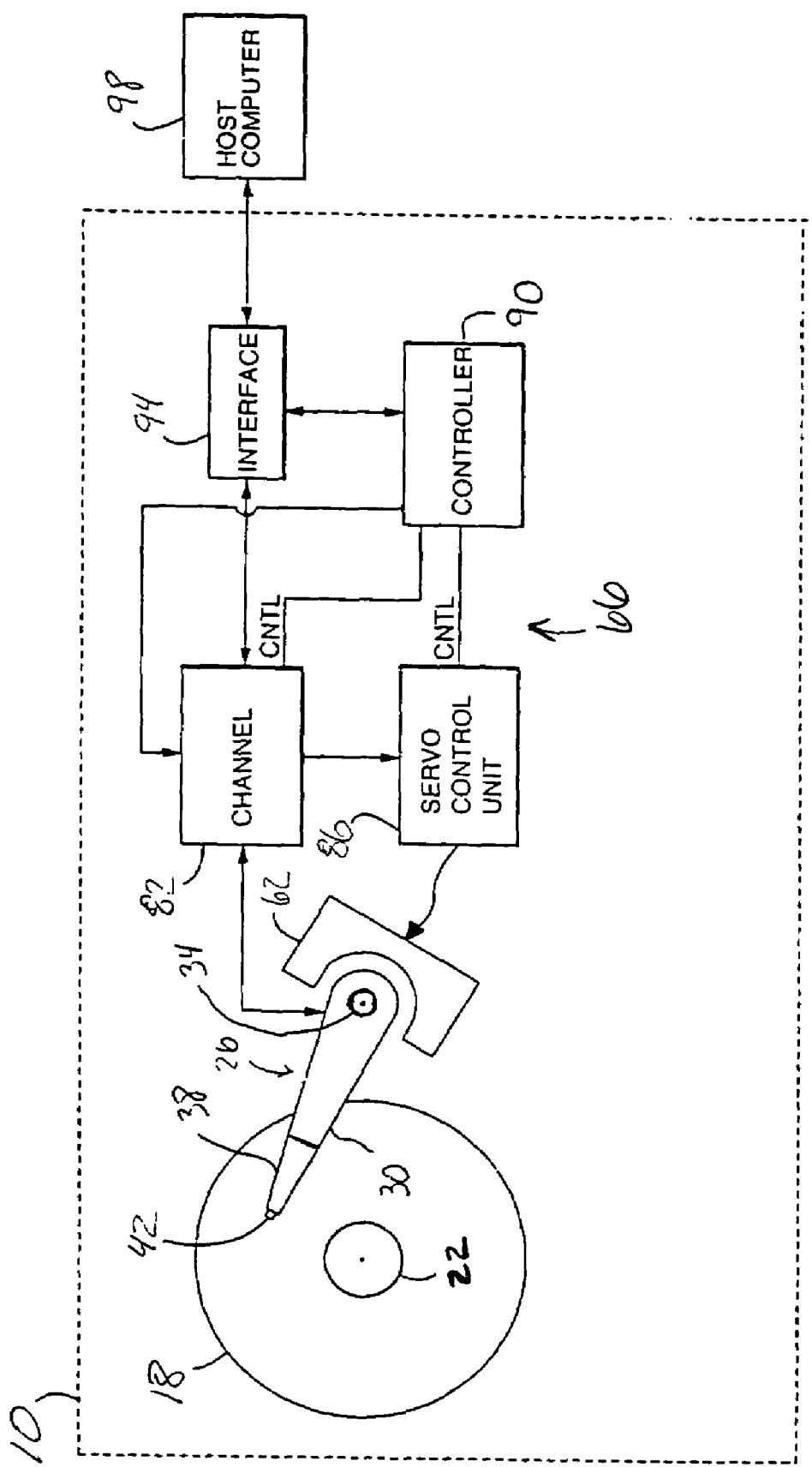
FIG. 4 is a simplified electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98.

Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

There is a continuing demand to increase the speed at which data is written to or retrieved from the data storage disk(s) 18 of the disk drive 10. One factor that can affect this speed is the speed at which the head(s) 44 of the head positioner assembly 26 settle on the desired track of the corresponding disk 18 after the head positioner assembly 26 has moved about the pivot bearing 34 via the action of the voice coil motor 62. This is commonly referred to in the art as "seek performance." Magnetic misalignment of the stationary voice coil motor magnet assemblies 64 of the voice coil motor 62 may cause undesired vibrations of the head positioner assembly 26 (commonly referred to in the art as post-seek oscillations or PSO) that increases the settle time of the head positioner assembly 26. One embodiment of a way to reduce the magnetic misalignment of the stationary voice coil motor magnets 64 is schematically illustrated in FIGS. 5A-D.

FIG. 5A schematically illustrates a disk drive voice coil motor 99 having an upper voice coil motor (VCM) assembly 100 that is supported above a lower voice coil motor (VCM) assembly 108 by at least one, and more typically a plurality of supports 116. The voice coil motor 99 may be used in the disk drive 10 or any other appropriate disk drive configuration, including in the magnetically aligned orientation discussed below. The supports 116 may be separate from or part of the upper VCM assembly 100, the lower VCM assembly 108, or both. The upper VCM assembly 100 includes an upper voice coil motor (VCM) magnet 104, while the lower VCM assembly 108 includes a lower voice coil motor (VCM) magnet 112. The space between the upper VCM magnet 104 and the lower VCM magnet 112 accommodates a coil (e.g., coil 63) that is mounted on a head positioner assembly (e.g., head positioner assembly 26). The magnetic field moves the coil (e.g., coil 63) relative to both the upper VCM magnet 104 and the lower VCM magnet 112, to in turn move the head positioner assembly (e.g., head positioner assembly 26) to position its head(s) (e.g., heads 44) to the desired track of the corresponding data storage disk (e.g., disks 18).

FIG. 5B illustrates an alignment fixture 118 that allows the upper VCM magnet 104 to be magnetically aligned with the lower VCM magnet 112. The alignment fixture 118 includes a plurality of elongate suspension members 122 that detachably engage or interact with the upper VCM assembly 100 in any appropriate manner. Any number of suspension members 122 may be utilized. However, preferably the alignment fixture 118 suspends the upper VCM magnet 104 above the supports 116 and also maintains the upper VCM magnet 104 parallel with the lower VCM magnet 112 during the magnetic alignment procedure. Therefore, the alignment fixture 118 will typically include at least three suspension members 122.

There are a number of key features of the alignment fixture 118 in relation to magnetically aligning the upper VCM magnet 104 with the lower VCM magnet 112. The suspension members 122 are compliant in the horizontal dimension, but sufficiently stiff in the vertical dimension (corresponding with their length dimension) so as to resist movement of the upper VCM magnet 104 toward the lower VCM magnet 112 while the upper VCM magnet 104 is being held in a suspended position by the alignment fixture 118 for magnetic alignment with the lower VCM magnet 112. That is, the suspension members 122 are sufficiently stiff in tension so as to restrain movement of the upper VCM magnet 104 to within a horizontal dimension while being suspended for magnetic alignment with the lower VCM magnet 112. Preferably, the suspension members 122 provide a reduced resistance to movement of the upper VCM magnet 104 in the horizontal dimension that magnetically aligns the same with the lower VCM magnet 112. In one embodiment, the upper VCM magnet 104 is suspended by the alignment fixture 118 such that a resistance of no more than about 0.03 Newtons exists to a movement of the upper VCM magnet 104 within the horizontal dimension to magnetically align the same with the lower VCM magnet 112. Therefore, the upper VCM magnet 104 in effect "floats" in the horizontal dimension for magnetic alignment with the lower VCM magnet 112.

The upper VCM assembly 100 will typically be positioned on the supports 116 when initially engaged by the alignment fixture 118. Although the magnetic field will retain the upper VCM assembly 100 on the supports 116, one or more mechanical fasteners are typically directed through the upper VCM assembly 100 and into the supports 116 to mechanically anchor the upper VCM assembly 100 to the supports 116. These mechanical fasteners will typically be removed or not installed when the alignment fixture 118 is used to allow the upper VCM magnet 104 to be magnetically aligned with the lower VCM magnet 112. However, it may be possible to only loosen any such fasteners to allow for magnetic alignment using the alignment fixture 118.

The alignment fixture 118 is moved in the direction of the arrow A in FIG. 5B to separate the upper VCM assembly 100 from the supports 116 and place the upper VCM assembly 100 in a suspended condition. This movement is perpendicular to the orientation of both the upper VCM magnet 104 and the lower VCM magnet 112 (e.g., a vertical motion or in the vertical dimension). So long as the upper VCM assembly 100 remains spaced from the supports 116 during the magnetic alignment, the spacing is sufficient. However, the spacing between the upper VCM magnet 104 and the lower VCM magnet 112 must be such that a magnetic field of a sufficient strength still exists between the magnets 104, 112 to allow this magnetic field to itself move the upper VCM magnet 104 relative to the stationary VCM magnet 112 into a magnetically aligned position.

The magnetic field between the upper VCM magnet 104 and the lower VCM magnet 112 itself will move the upper VCM assembly 100 relative to the stationary lower VCM assembly 108, as illustrated in FIG. 5C, if the upper VCM magnet 104 is not magnetically aligned with the lower VCM magnet 112 when the upper VCM assembly 100 is being held in a suspended position by the alignment fixture 118. This movement of the upper VCM assembly 100 is allowed by the compliant nature of the suspension members 122 of the alignment fixture 118 (e.g., by an elastic deformation, bending, or flexing of one or more of the suspension members 122 in the horizontal dimension). However, this movement of the upper VCM assembly 100 is constrained to within a reference plane B (e.g., a horizontal plane or dimension). That is, the fixture 118 maintains the upper VCM magnet 104 and the lower VCM magnet 112 in parallel relation during the magnetic alignment in which the upper VCM magnet 104 moves relative to the lower VCM magnet 112. Stated another way, the stiffness of the suspension members 122 in the vertical dimension keeps the upper VCM magnet 104 from moving toward the lower VCM magnet 112 while the alignment fixture 118 is suspending the upper VCM 100 assembly for magnetic alignment with the lower VCM assembly 108. The upper VCM assembly 100 may translate, rotate, or both within the reference plane B to magnetically align the upper VCM magnet 104 with the lower VCM magnet 112.

"Magnetically aligned" in terms of the position of the upper VCM magnet 104 relative to the lower VCM magnet 112 is subject to a number of characterizations. One is that magnetic alignment increases the verticality of the magnetic field lines that extend between the upper VCM magnet 104 and the lower VCM magnet 112. Another characterization is that magnetic alignment minimizes a non-vertical component of a magnetic field extending between the upper VCM magnet 104 and the lower VCM magnet 112. Yet another characterization is that magnetic alignment maximizes a vertical component of a magnetic field extending between the upper VCM magnet 104 and the lower VCM magnet 112.

Once the upper VCM magnet 104 has moved into magnetic alignment with the lower VCM magnet 112 and as illustrated in FIG. 5D, the alignment fixture 118 is moved in the direction of the arrow C (directly opposite the direction of the arrow A in FIG. 5B) to position the upper VCM assembly 100 back onto the supports 116 or into a vertically supported condition. The magnetically aligned orientation of the upper VCM magnet 104 to the lower VCM magnet 112 is maintained during this movement. Thereafter, a fastener (not shown) will typically be directed through the upper VCM assembly 100 and into each support 116 to mechanically fix the upper VCM assembly 100 to the supports 116.

Figure 6A:
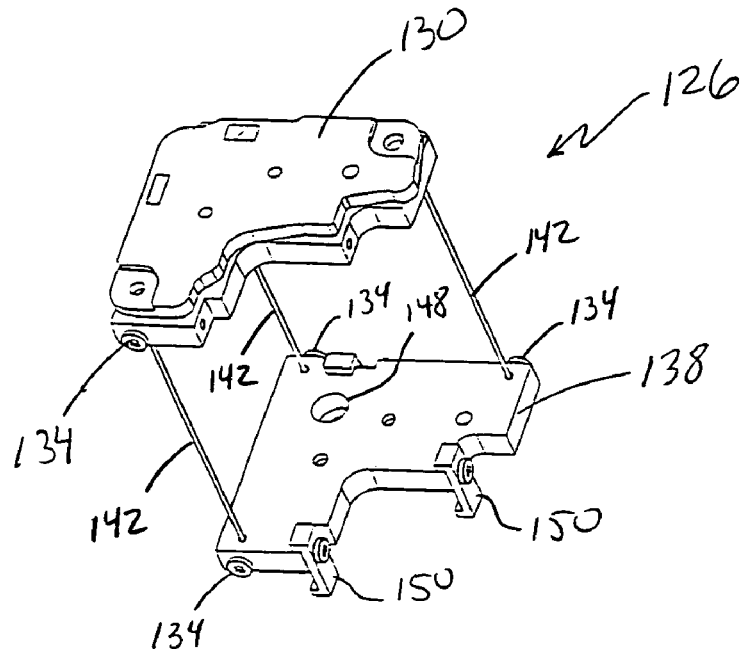
FIG. 6A is a perspective view of one embodiment of an alignment fixture that allows an upper voice coil motor magnet to magnetically align with a lower voice coil motor magnet.
Figure 6B:
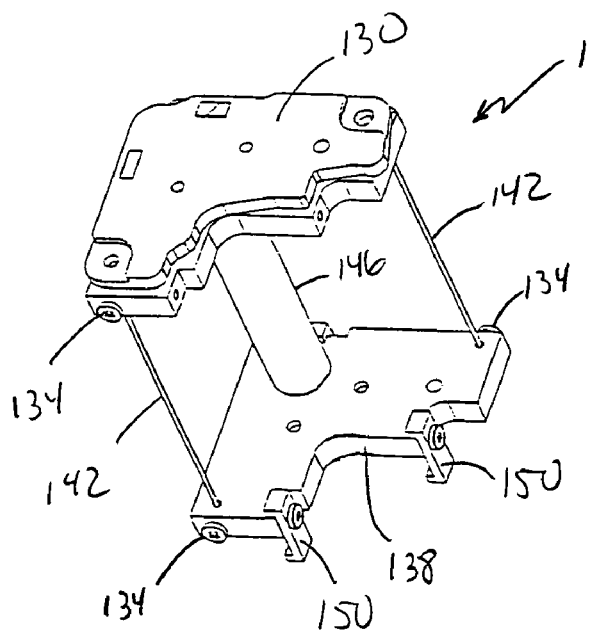
FIG. 6B is a perspective view of the alignment fixture of FIG. 6A, with a travel limit post installed between its upper and lower fixtures.
Figure 6C:
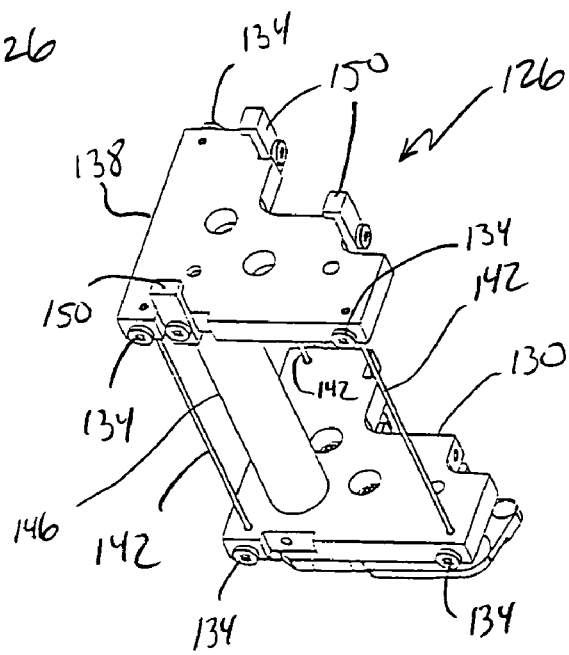
FIG. 6C is a perspective view of the alignment fixture of FIG. 6A in an inverted position.

One configuration that may be used by the alignment fixture 118 of FIGS. 5A-D is illustrated in FIGS. 6A-C and is identified by reference numeral 126. The alignment fixture 126 includes a first or upper fixture 130 and a second or lower fixture 138. Appropriate tooling engages the upper fixture 130 to move the alignment fixture 126 during installation and to allow for the desired magnetic alignment of an upper voice coil magnet to a lower voice coil magnet. The lower fixture 138 includes a plurality of catches 150 that may be used to detachably engage and support an upper voice coil magnet assembly or magnet and allow the same to move into a magnetically aligned relation with a stationary lower voice coil magnet assembly or magnet by a movement of the lower fixture 138 in parallel relation with the then stationary upper fixture 130.

Figure 6D:
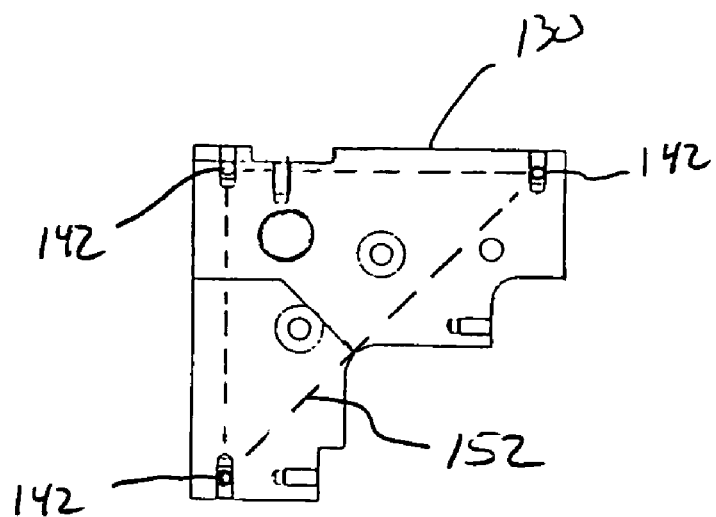
FIG. 6D is a top view illustrating the area collectively defined by the three suspension wires used by the alignment fixture of FIGS. 6A-C.

A plurality of wires 142 extend between and are interconnected with each of the upper fixture 130 and the lower fixture 138 by set screws 134. Any appropriate number of wires 142 may be utilized, so long as the lower fixture 138 remains parallel with the upper fixture 130 during a magnetic alignment procedure. Typically this will require at least three wires 142. The center of force of the upper voice coil motor magnet being magnetically aligned using the fixture 126 should extend through an area having a perimeter collectively defined by the location of the wires 142 supporting the lower fixture 138 (which coincides with the area 152 illustrated in FIG. 6D in relation to the upper fixture 130).

Figure 6E:
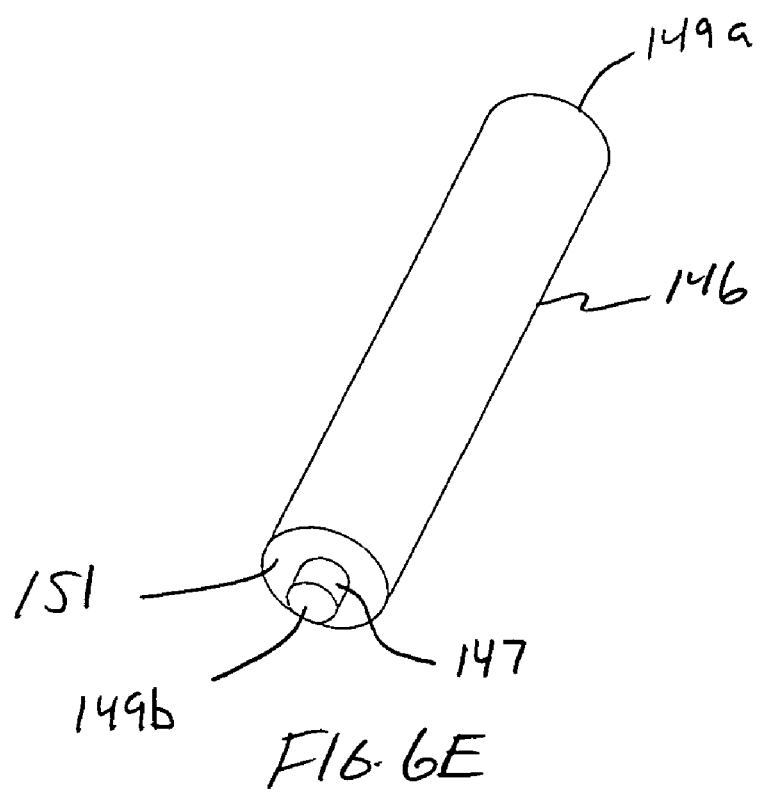
FIG. 6E is a perspective view of the travel limit post used by the alignment fixture of FIGS. 6A-C.

A travel limit post 146 extends between the upper fixture 130 and the lower fixture 138 and provides a number of functions. One is that the travel limit post 146 provides some structural integrity for the alignment fixture 126 when not in use for a magnetic alignment. The wires 142 will typically provide little stiffness in compression (e.g., little resistance to a movement of the lower fixture 138 toward the upper fixture 130, or vice versa). The travel limit post 146 may prevent the fixture 126 from being compressed to an undesired degree by a relative movement of the upper fixture 130 and lower fixture 138 toward each other. One end 149a of the travel limit post 146 is attached to the upper fixture 130, while a shoulder 151 disposed toward its opposite end 149b may engage an upper surface of the lower fixture 138 (FIG. 6E). Therefore, the travel limit post 146 limits the minimum vertical spacing between the upper fixture 130 and the lower fixture 138.

The travel limit post 146 does allow the lower fixture 138 to move horizontally or laterally relative to the upper fixture 130. In this regard and referring to FIG. 6E, the travel limit post 146 includes a smaller diameter projection 147 that defines the end 149b of the travel limit post 146. This projection 147 is disposed within a hole 148 that extends at least within the lower fixture 138 (i.e., partially or completely through the fixture 138). The diameter of the hole 148 in the lower fixture 138 is greater than the diameter of the projection 147 of the travel limit post 146. However, a diameter of a shoulder 151 of the travel limit post 146 is greater than that of the hole 148, and may (but need not) abut an upper surface of the lower fixture 138 to provide vertical support for the alignment fixture 126 in accordance with the foregoing.

With the outer diameter of the projection 147 being less than the diameter of the hole 148 in the lower fixture 138, at least some movement of the lower fixture 138 relative to the upper fixture 130 in the horizontal or lateral dimension is allowed by the travel limit post 146 (until the outer wall of the projection 147 contacts a wall of the lower fixture 138 that defines the hole 148). The wires 142 that extend between and interconnect the upper fixture 130 and the lower fixture 138 are compliant, bendable, or elastically deformable in the horizontal dimension (perpendicular to their length dimension), and provide a reduced resistance to this movement of the lower fixture 138 within this horizontal or lateral dimension. However, the wires 142 are stiff in the vertical dimension or in their length dimension. Generally, the resistance provided by the wires 142 to movement of the lower fixture 138 relative to the upper fixture 130 in the lateral or horizontal dimension is less, and more preferably substantially less, than the resistance provided by the wires 142 to a movement of the lower fixture 138 away from the upper fixture 130 in the vertical dimension. In one embodiment, the resistance to a movement of the lower fixture 138 away from the upper fixture 130 in the vertical dimension is at least 9,000 times greater than the resistance provided by the wires 142 to a movement of the lower fixture 138 relative to the upper fixture 130 in a horizontal or lateral dimension. Preferably, the wires 142 provide little to no resistance to movement of the lower fixture 138 in the horizontal dimension while the upper fixture 130 is maintained in a stationary position in the horizontal dimension. In one embodiment, the wires 142 provide a resistance of no more than about 0.03 Newtons to a movement of the lower fixture 138 in the horizontal dimension.

The upper fixture 130 and lower fixture 138 are disposed in parallel relation, and this parallel relationship between the upper fixture 130 and the lower fixture 138 is maintained during movement of the lower fixture 138 for a magnetic alignment procedure. At least one of the screws 134 may be loosened to allow the amount of the corresponding wire 142 extending between the upper fixture 130 in the lower fixture 138 to be adjusted. That is, the wires 142 extend within/ through an aperture formed in both the upper fixture 130 and the lower fixture 138. Each screw 134 interfaces with one of these apertures. An appropriate gage may be used to dispose the upper fixture 130 and lower fixture 138 in parallel relation with the desired vertical spacing therebetween (by sliding the wires 142 relative to the upper fixture 130, the lower fixture 138, or both) at which time the various screws 134 may be tightened to fix the length of the wires 142 that extends between and interconnects the upper fixture 130 and the lower fixture 138.

Figure 7:
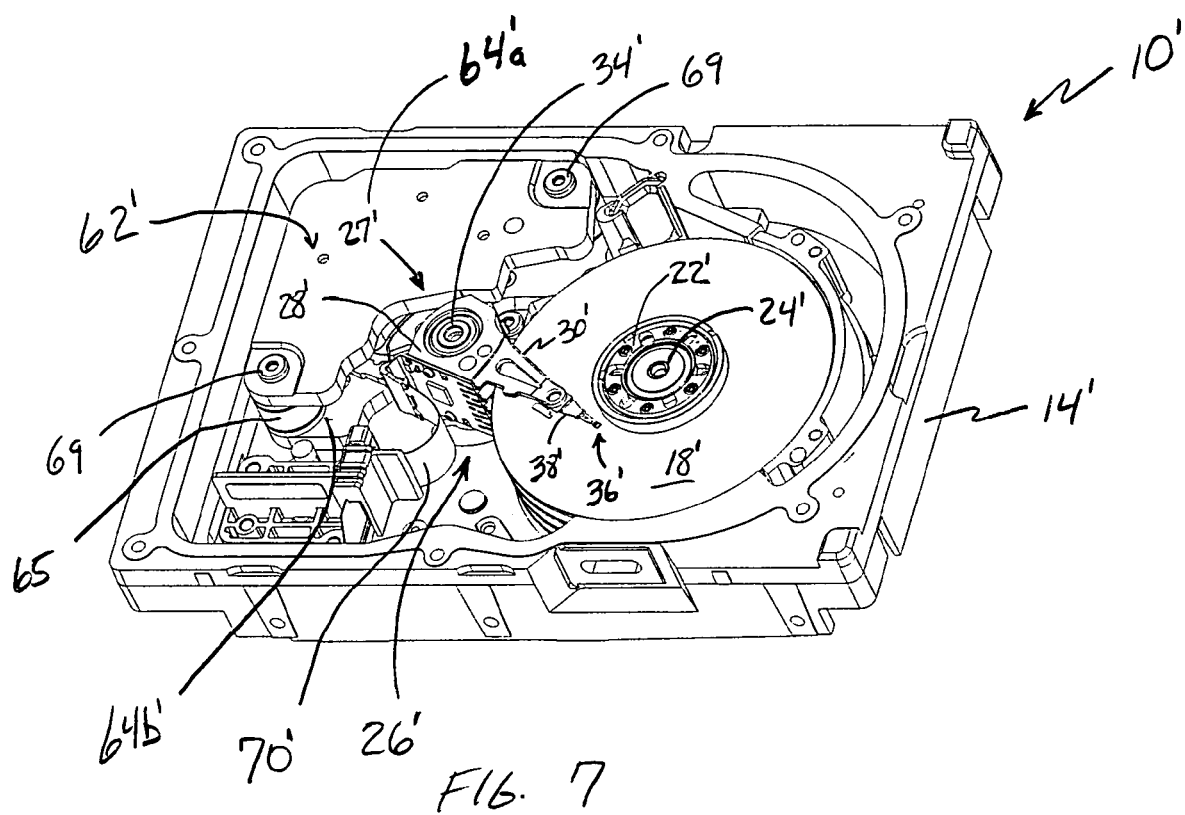
FIG. 7 is a perspective view of one embodiment of a disk drive with a voice coil motor for moving a head positioner assembly of the drive.
Figure 8:
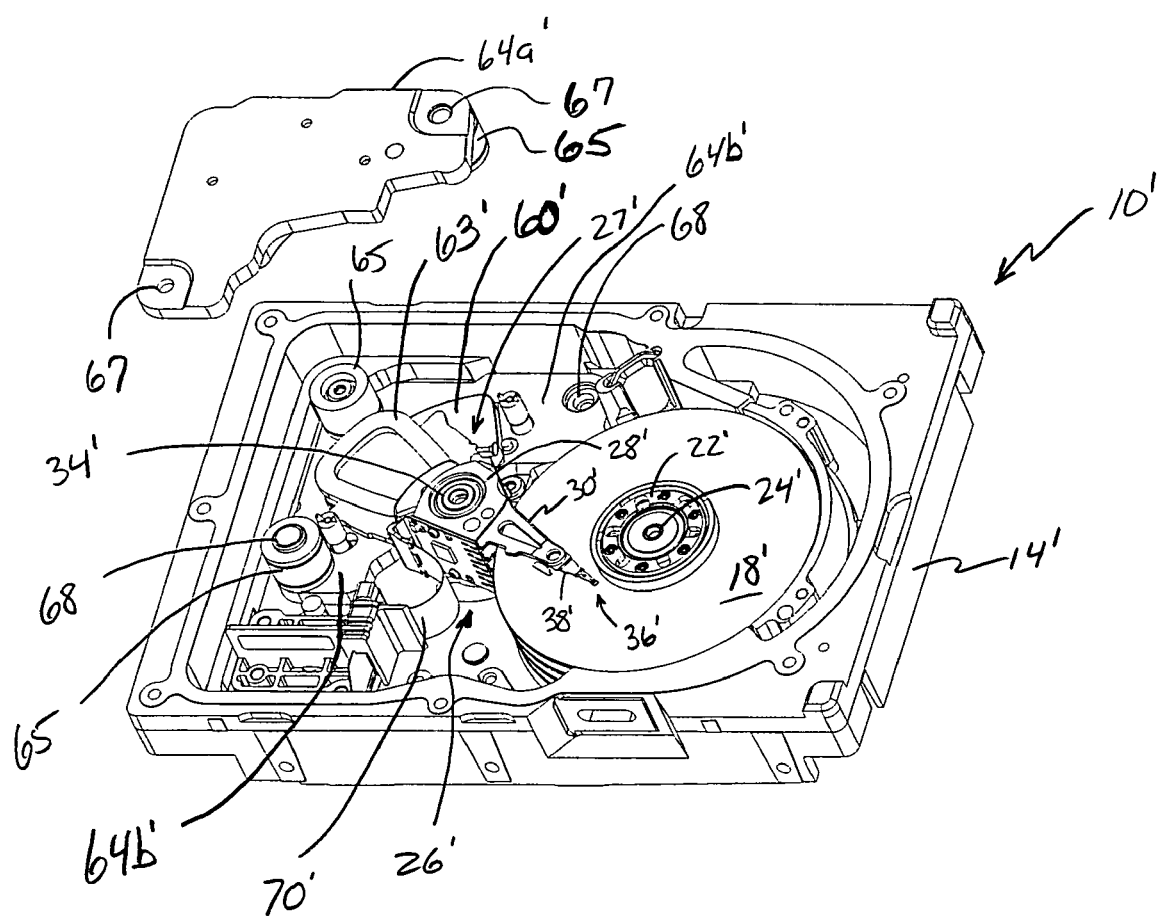
FIG. 8 is a perspective view of the disk drive of FIG. 7, with an upper voice coil motor magnet assembly being "exploded" away from a lower voice coil motor magnet assembly.

FIGS. 7-8 illustrate another embodiment of a disk drive 10'. The disk drive 10' of FIG. 7 includes a base plate 14', a plurality of vertically spaced data storage disks 18', a disk clamp 22', a spindle motor shaft 24' of a spindle motor, a head positioner assembly 26', a pivot bearing 34', an actuator 27', an actuator body 28', a voice coil motor (VCM) 62', a coil 63', an upper voice coil motor (VCM) assembly 64a', a lower voice coil motor (VCM) assembly 64b' having a magnet 60', a plurality of actuator arms 30', a plurality of suspensions 38' (only one shown), a plurality of head/gimbal assemblies 36' (only one shown), and a flex cable 70'. The various features and interrelationships of these components at least generally correspond with the discussion presented above in relation to the disk drive 10 of FIGS. 1-4 and need not be repeated herein. Those components of the disk drive 10' that at least generally correspond with those of the disk drive 10 of FIGS. 1-4 (possibly structurally, but at least functionally) are identified with a common reference numeral, followed by a "single prime" designation.

The VCM 62' utilizes the lower VCM assembly 64b' (having a lower magnet 60') that is appropriately fixed or anchored to the base plate 14', the upper VCM assembly 64a' (having an upper magnet) that is vertically spaced from and fixed relative to the lower VCM assembly 64b' for normal disk drive operations, and the coil 63' that is disposed therebetween and attached to the actuator body 28' of the actuator 27' of the head positioner assembly 26' in the illustrated embodiment. The coil 63' moves within a horizontal reference plane in a space between the upper VCM assembly 64a' and the lower VCM assembly 64b', to in turn move the actuator body 28' and thereby the head positioner assembly 26' relative to the plurality of data storage disks 18'. Any way of vertically supporting the upper VCM assembly 64a' relative to the lower VCM assembly 64b' may be utilized. In the illustrated embodiment, a single support 65 extends downwardly from the upper VCM assembly 64a', while a pair of supports 65 extend upwardly from the lower VCM assembly 64b', to maintain the upper VCM assembly 64a' in a fixed spaced relationship with the lower VCM assembly 64b'.

An appropriate number of mounting holes 67 extend through the upper VCM assembly 64a' and are aligned with a corresponding mounting hole 68 in the lower VCM assembly 64b'. The holes 67 in the upper VCM assembly 64a' are larger than the holes 68 in the lower VCM assembly 64b'. This allows the position of the upper VCM assembly 64a' to be adjusted in the horizontal dimension, and yet still have the holes 67 in the upper VCM assembly 64a' to be aligned with their corresponding hole 68b' in the lower VCM assembly 64b'. A screw 69 is disposed in each hole 67 in the upper VCM assembly 64a' and is threaded into its aligned hole 68 to mechanically anchor the upper VCM assembly 64a' to the lower VCM assembly.

The upper VCM assembly 64a' may be magnetically aligned with the lower VCM assembly 64b' in the same general manner discussed above in relation to FIGS. 5A-D. Typically the upper VCM assembly 64a' will be positioned relative to the lower VCM assembly 64b' without being mechanically coupled thereto or anchored relative thereto.

Figure 9:
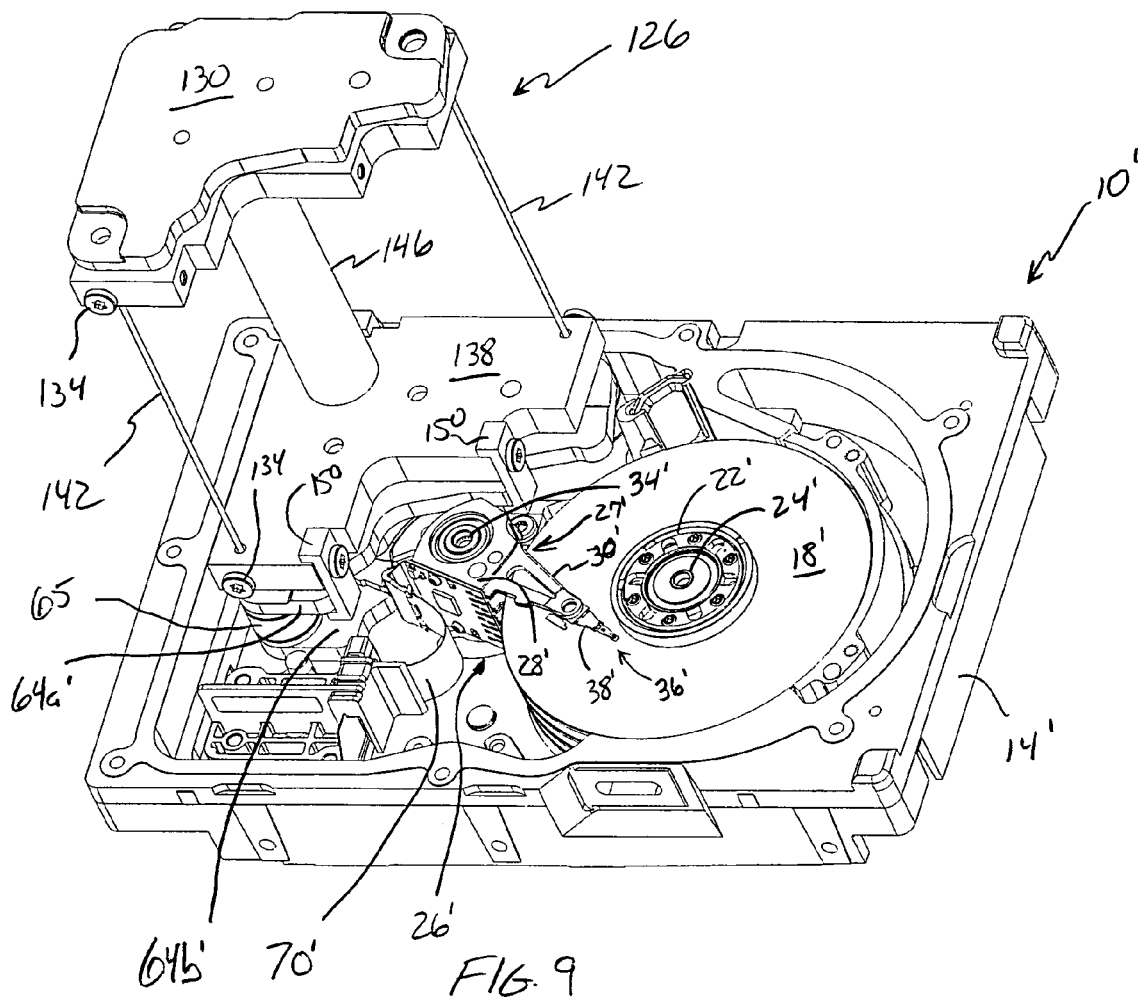
FIG. 9 is a perspective view of the alignment fixture of FIGS. 6A-C having lifted the upper voice coil motor magnet assembly away from the lower voice coil motor magnet assembly to allow the magnetic field to move the upper voice coil motor magnet assembly within a horizontal plane and into magnetic alignment with the lower voice coil motor magnet assembly.

That is, typically the screws 69 will be entirely removed or at least loosened for a magnetic alignment procedure. In any case and referring to FIG. 9, tooling (not shown) appropriately engages the upper fixture 130 of the alignment fixture 126 and advances the entire alignment fixture 126 toward the upper VCM assembly 64a' in the vertical dimension. The alignment fixture 126 is somewhat "off to the side" such that the catches 150 on the lower fixture 138 may be positioned alongside the upper VCM assembly 64a'. The alignment fixture 126 is then generally moved in the lateral or horizontal dimension so as to dispose the catches 150 directly under the lower surface of the upper VCM assembly 64a'. At this time the lower fixture 138 is in position to support the upper VCM assembly 64a'.

The tooling thereafter moves the alignment fixture 126 in the vertical dimension to separate the upper VCM assembly 64a' from the lower VCM assembly 64b' (to increase the spacing therebetween) and dispose the upper VC assembly 64a' in a suspended position. With the upper VCM assembly 64a' being entirely separated from the lower VCM assembly 64b' (such that there is no remaining structural interconnection), and thereby suspended from the alignment fixture 126, the magnetic field between the upper VCM assembly 64a' and the lower VCM assembly 64b' will move the upper VCM assembly 64a' within a horizontal reference plane into magnetic alignment with the lower VCM assembly 64b. Again, this may be a translational motion, a rotational motion, a combination thereof, or any other motion so long as the motion is confined to the horizontal dimension. This movement of the lower fixture 138 is provided by a flexing or elastic deformation of the wires 142 of the alignment fixture 126 in the horizontal dimension, and with the lower fixture 138 being maintained in parallel relation with the upper fixture 130. Therefore, the upper VCM assembly 64a' remains in parallel relation with the lower VCM assembly 64b' during the magnetic alignment procedure. Once the upper VCM assembly 64a' is in a stationary position in the horizontal dimension (thereby indicating that magnetic alignment has been achieved), the tooling may again move the alignment fixture 126 in the vertical dimension back toward the lower VCM assembly 64b' until the upper VCM assembly 64a' is once again supported in the vertical dimension by the supports 65. The upper VCM assembly 64a' remains in the magnetically aligned orientation in the horizontal dimension during this "re-seating" of the upper VCM assembly 64a' to a position where the supports 65 vertically support the same. The magnetic forces at this time are sufficient to retain the desired orientation of the upper VCM assembly 64a' relative to the lower VCM assembly 64b in the horizontal dimension to allow the alignment fixture 126 to be removed from the upper VCM assembly 64a'. Since the holes 67 in the upper VCM assembly 64a' again are larger than the holes 68 in the lower VCM assembly 64b', the screws 69 may still then be installed to mechanically fix the upper VCM assembly 64a' to the lower VCM assembly 64b. Since the upper VCM assembly 64a' is now magnetically aligned with the lower VCM assembly 64b', the forces being exerted on the head positioner assembly 26' to move the same about pivot bearing 34' are more horizontal which minimizes post-seek oscillations.

The alignment fixture 118 of FIGS. 5A-D and the alignment fixture 126 of FIGS. 6A-E, both allow an upper VCM assembly to be engaged, suspended above a lower VCM assembly, moved within a horizontal dimension into magnetic alignment with the lower VCM assembly, and then moved in a vertical dimension to a fixed vertical position relative to the lower VCM assembly while maintaining the magnetically aligned orientation in the horizontal dimension. Other alignment fixture configurations may provide this basic functionality, and are within the scope of the present invention. It should be appreciated that any such alignment fixture may detachably engage the upper VCM assembly in any appropriate manner. Furthermore, it should be appreciated that certain detachable engagements of the alignment fixture with the upper VCM assembly may not require the lateral motion described above with regard to the alignment fixture 126.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for making a disk drive, comprising the steps of:
   installing a lower voice coil motor magnet;
   installing a head positioner assembly, wherein a coil is interconnected with said head positioner assembly;
   suspending an upper voice coil motor magnet above said lower voice coil motor magnet;
   magnetically aligning said upper voice coil motor magnet with said lower voice coil motor magnet during said suspending step; and
   executing a first supporting step comprising supporting said upper voice coil motor magnet above said lower voice coil motor magnet after said magnetically aligning step.

2. The method, as claimed in claim 1, wherein:
   said suspending step comprises allowing said upper voice coil motor magnet to move only within a reference plane for said magnetically aligning step.

3. The method, as claimed in claim 1, wherein:
   said suspending step comprises allowing said upper voice coil motor magnet to both translate and rotate within a single reference plane for said magnetically aligning step.

4. The method, as claimed in claim 1, wherein:
   said suspending step comprises maintaining said upper voice coil motor magnet in parallel relation with said lower voice coil motor magnet during said magnetically aligning step.

5. The method, as claimed in claim 1, wherein:
   said suspending step comprises coupling a first fixture and a second fixture with a plurality of compliant members, wherein said first fixture is maintained in a stationary position during said magnetically aligning step, wherein said upper voice coil motor magnet is engaged by said second fixture, and wherein said magnetically aligning step comprises elastically deforming at least one of said plurality of compliant members to allow said second fixture and said upper voice coil motor magnet to move for said magnetically aligning step.

6. The method, as claimed in claim 1, wherein:
said suspending step comprises suspending said upper voice coil motor magnet from a first fixture using at least two elongate members.

7. The method, as claimed in claim 6, wherein:
said magnetically aligning step comprises exerting at least one of a bending force and a torsional force on each of said at least two elongate members.

8. The method, as claimed in claim 6, wherein:
said at least two elongate members are attached to said first fixture and a second fixture, wherein said second fixture is detachably engaged with said upper voice coil motor magnet for said suspending step and said magnetically aligning step.

9. The method, as claimed in claim 6, wherein:
said at least two elongate members comprises first, second, and third wires.

10. The method, as claimed in claim 1, wherein:
said suspending step comprises maintaining said upper voice coil motor magnet and said lower voice coil motor magnet in parallel relation.

11. The method, as claimed in claim 1, wherein:
said suspending step comprises providing a first resistance to a movement of said upper voice coil motor magnet along a first axis toward said lower voice coil motor magnet, and providing a second resistance to a movement of said upper voice coil motor magnet in a first reference plane that is perpendicular to said first axis, wherein said second resistance is substantially less than said first resistance.

12. The method, as claimed in claim 1, wherein:
said suspending step comprises providing a resistance of no more than about 0.03 Newtons to a movement of said upper voice coil motor magnet within a horizontal dimension for said magnetically aligning step.

13. The method, as claimed in claim 1, wherein:
said magnetically aligning step comprises orienting magnetic field lines extending between said upper voice coil motor magnet and said lower voice coil motor magnet so as to be parallel with an axis about which said head positioner assembly moves during disk drive operations.

14. The method, as claimed in claim 1, wherein:
said magnetically aligning step comprises increasing a verticality of magnetic field lines extending between said upper voice coil motor magnet and said lower voice coil motor magnet.

15. The method, as claimed in claim 1, wherein:
said magnetically aligning step comprises minimizing a non-vertical component of a magnetic field extending between said upper voice coil motor magnet and said lower voice coil motor magnet.

16. The method, as claimed in claim 1, wherein:
said magnetically aligning step comprises maximizing a vertical component of a magnetic field extending between said upper voice coil motor, magnet and said lower voice coil motor magnet.

17. The method, as claimed in claim 1, wherein:
said magnetically aligning step comprises limiting a movement of said upper voice coil motor magnet to within a plane that is parallel with said lower voice coil motor magnet.

18. The method, as claimed in camp claim 1, wherein:
said magnetically aligning step comprises using only magnetic forces to move said upper voice coil motor magnet to a magnetically aligned position with said lower voice coil motor magnet.

19. The method, as claimed in claim 1, further comprising the steps of:
executing a second supporting step comprising supporting said upper voice coil motor magnet above said lower voice coil motor magnet before said suspending step; and
lifting said upper voice coil motor magnet to terminate said second supporting step and for execution of said suspending step.

20. The method, as claimed in claim 1, further comprising the steps of:
lowering said upper voice coil motor magnet after said magnetically aligning step, wherein said lowering step is in a direction that is perpendicular to a plane in which said upper voice coil motor magnet was moved during said magnetically aligning step, wherein said first supporting step is executed after said lowering step.

21. The method, as claimed in claim 1, further comprising the steps of:
executing a second supporting step comprising supporting said upper voice coil motor magnet above said lower voice coil motor magnet before said suspending step;
lifting said upper voice coil motor magnet to terminate said second supporting step and for execution of said suspending step; and
lowering said upper voice coil motor magnet after said suspending step, wherein said lowering step is in a direction that is perpendicular to a plane in which said upper voice coil motor magnet was moved during said magnetically aligning step, wherein said first supporting step is executed after said lowering step.

22. A method for making a disk drive, comprising the steps of:
installing a lower voice coil motor magnet;
installing a head positioner assembly, wherein a coil is interconnected with said head positioner assembly; and
moving an upper voice coil motor magnet to a first orientation relative to said lower voice coil motor magnet using a magnetic field between said upper voice coil motor magnet and said lower voice coil motor magnet, wherein said upper voice coil motor magnet and said lower voice coil motor magnet are maintained in parallel relation during said moving step.

23. The method, as claimed in claim 22, wherein:
said moving step comprises improving a magnetic alignment of said upper voice coil motor magnet to said lower voice coil motor magnet.

24. The method, as claimed in claim 22, wherein:
said moving step comprises magnetically aligning said upper voice coil motor magnet with said lower voice coil motor magnet.

25. The method, as claimed in claim 22, wherein:
said moving step comprises increasing a verticality of magnetic field lines extending between said upper voice coil motor magnet and said lower voice coil motor magnet.

26. The method, as claimed in claim 22, wherein:
said moving step comprises minimizing a non-vertical component of a magnetic field extending between said upper voice coil motor magnet and said lower voice coil motor magnet.

27. The method, as claimed in claim 22, wherein:
said moving step comprises maximizing a vertical component of a magnetic field extending between said upper voice coil motor magnet and said lower voice coil motor magnet.

28. The method, as claimed in claim 22, wherein:
said moving step is executed entirely within a reference plane.

29. The method, as claimed in claim 22, wherein:
said moving step uses only said magnetic field.

30. The method, as claimed in claim 22, further comprising the step of:
suspending said upper voice coil motor magnet above said lower voice coil motor magnet, wherein said moving step is executed during said suspending step.

31. The method, as claimed in claim 30, wherein:
said suspending step comprises allowing said upper voice coil motor magnet to both translate and rotate for said moving step.

32. The method, as claimed in claim 30, wherein:
said suspending step comprises coupling a first fixture member and a second fixture member with a plurality of compliant members, wherein said upper voice coil motor magnet is engaged by said second fixture, wherein said moving step comprises elastically deforming at least one of said plurality of compliant members.

33. The method, as claimed in claim 30, wherein:
said suspending step comprises suspending said upper voice coil motor magnet from a first fixture using at least two elongate members.

34. The method, as claimed in claim 33, wherein:
said moving step comprises exerting at least one of a bending force and a torsional force on each of said at least two elongate members.

35. The method, as claimed in claim 33, wherein:
said at least two elongate members are attached to said first fixture and a second fixture, wherein said second fixture is detachably engaged with said upper voice coil motor magnet for said suspending step and said moving step.

36. The method, as claimed in claim 33, wherein:
said at least two elongate members comprise first, second, and third wires.

37. The method, as claimed in claim 30, wherein:
said suspending step comprises providing a first resistance to a movement of said upper voice coil motor magnet along a first axis toward said lower voice coil motor magnet and providing a second resistance to a movement of said upper voice coil motor magnet in a first reference plane that is perpendicular to said first axis, wherein said second resistance is substantially less than said first resistance.

38. The method, as claimed in claim 30, wherein:
said suspending step comprises providing a resistance of no more than about 0.03 Newtons for execution of said moving step within a horizontal dimension.

39. The method, as claimed in claim 30, further comprising the steps of:
executing a first supporting step comprising supporting said upper voice coil motor magnet above said lower voice coil motor magnet;

lifting said upper voice coil motor magnet to terminate said first supporting step and to initiate said suspending step; and lowering said upper voice coil motor magnet after said moving step and with said upper voice coil motor remaining in said first orientation, wherein said lowering step is in a direction that is perpendicular to a plane in which said moving step is executed; and executing a second supporting step comprising supporting said upper voice coil motor magnet above said lower voice coil motor magnet, wherein said second supporting step is executed after said lowering step.

* * * * *